United States Patent [19]

Winterton

[11] Patent Number: 5,341,754

[45] Date of Patent: Aug. 30, 1994

[54] ROTARY ROW CLEANER FOR A PLANTER

[75] Inventor: Dean A. Winterton, Paw Paw, Ill.

[73] Assignee: Farmer's Factory Co., Lee, Ill.; a part interest

[21] Appl. No.: 863,219

[22] Filed: Apr. 3, 1992

[51] Int. Cl.⁵ .............................................. A01C 5/04
[52] U.S. Cl. .................................... 111/139; 111/157; 111/143; 172/551; 172/520
[58] Field of Search .................. 172/29, 27, 540, 551, 172/349, 520, 574, 661, 184, 617; 111/139, 143, 157, 52, 62, 140-142, 59, 83, 149, 164-169, 151

[56] References Cited

U.S. PATENT DOCUMENTS

| | | | |
|---|---|---|---|
| 4,004,640 | 1/1977 | Bland | 111/52 |
| 4,214,537 | 7/1980 | Bailey et al. | 111/149 |
| 4,275,670 | 6/1981 | Dreyer | 111/167 |
| 4,311,979 | 3/1983 | Peterson et al. | 111/52 |
| 4,461,355 | 7/1984 | Peterson et al. | 111/140 |
| 4,553,607 | 11/1985 | Behn et al. | 172/156 |
| 4,660,653 | 4/1987 | Mayeda et al. | 172/522 |
| 4,693,331 | 9/1987 | Johnson et al. | 180/135 |
| 4,702,323 | 10/1987 | Smit et al. | 111/52 |
| 4,744,316 | 5/1988 | Lieuemann et al. | 111/164 |
| 4,785,890 | 11/1988 | Martin | 172/29 |
| 4,947,770 | 8/1990 | Johnston | 111/167 |
| 4,974,683 | 12/1990 | Hanig et al. | 111/52 |
| 5,076,180 | 12/1991 | Schneider | 111/139 |
| 5,152,349 | 10/1992 | Roden | 111/139 |
| 5,163,518 | 11/1992 | Foley | 111/62 |

OTHER PUBLICATIONS

Yetter brochure, "Your One-Stop Headquarters . . . ", selected pages, Nov. 1984.

*Primary Examiner*—Randolph A. Reese
*Assistant Examiner*—Spencer Warnick
*Attorney, Agent, or Firm*—Leydig, Voit & Mayer

[57] ABSTRACT

A planter includes a pair of toothed wheels which sweep mulch away from the path followed by furrow opening discs. The sweeper wheels are carried on the trailing end of a parallel bar linkage attached to a tool bar by which the planter is pulled. As a result of the parallel bar linkage, the sweeper wheels may float upwardly and downwardly independently of the planter frame in order to conform to uneven ground and achieve more effective removal of the mulch without significantly disturbing the soil. The forward location of the sweeper wheels enables a coulter to be mounted on the planter frame and slice vertically into the ground ahead of the furrow opening discs.

3 Claims, 3 Drawing Sheets

ROTARY ROW CLEANER FOR A PLANTER

BACKGROUND OF THE INVENTION

The present invention relates to a rotary, ground-driven row cleaner for use in conservation tillage farming (i.e., no-till or low-till) and particularly useful in conjunction with row planter units. A planter unit with a ground-driven row cleaner is disclosed in Martin U.S. Pat. No. 4,785,890. Several planter units may be attached to an elongated and laterally extending tool bar adapted to be pulled forwardly across the field by a tractor.

The row cleaner of the Martin patent comprises two toothed wheels which are located so as to sweep residue (e.g., organic mulch) laterally away from the path followed by furrow opening means which may take the form of a pair of forwardly converging discs adapted to create a furrow in the soil. The toothed sweeper wheels are mounted on the rigid frame of the planter unit ahead of a pair of depth gauge wheels and are located at the position usually occupied by a rotatable coulter. When used, a coulter slices vertically into the soil ahead of the furrow openers and facilitates formation of the furrow by the openers.

In the Martin apparatus, the advantages of a coulter are lost since the coulter is replaced by the sweeper wheels. Moreover, the rigid mounting of sweeper wheels on the frame of the planter unit ahead of the gauge wheels makes it difficult for the sweeper wheels to rise and fall as they move over uneven ground. As a result, the sweeper wheels tend to move too much soil as they pass through a ridge and tend to leave too much residue as they pass over a valley.

SUMMARY OF THE INVENTION

The general aim of the present invention is to provide apparatus of the foregoing type in which the sweeper wheels are divorced from the frame of the planter unit and are capable of controlled vertical floating so as to enable the sweeper wheels to follow uneven ground and effectively remove residue with very little disturbance of the soil.

A further object of the invention is to position the sweeper wheels such that a coulter may be located between the sweeper wheels and the furrow openers and may act to slice vertically into the soil after the soil has been cleared of residue and before the furrow is opened.

A more detailed object is to achieve the foregoing by supporting the sweeper wheels on downwardly biased parallel bars attached to the tool bar and mounting the sweeper wheels for controlled up an down floating. By virtue of attaching the sweeper wheels to the tool bar with the parallel bars, a coulter may be attached to the planter frame at a conventional location ahead of the furrow openers.

These and other objects and advantages of the invention will become more apparent from the following detailed description when taken in conjunction with the accompanying drawings.

DETAILED DESCRIPTION OF THE PREFERRED EMBODIMENT

Figure 1:
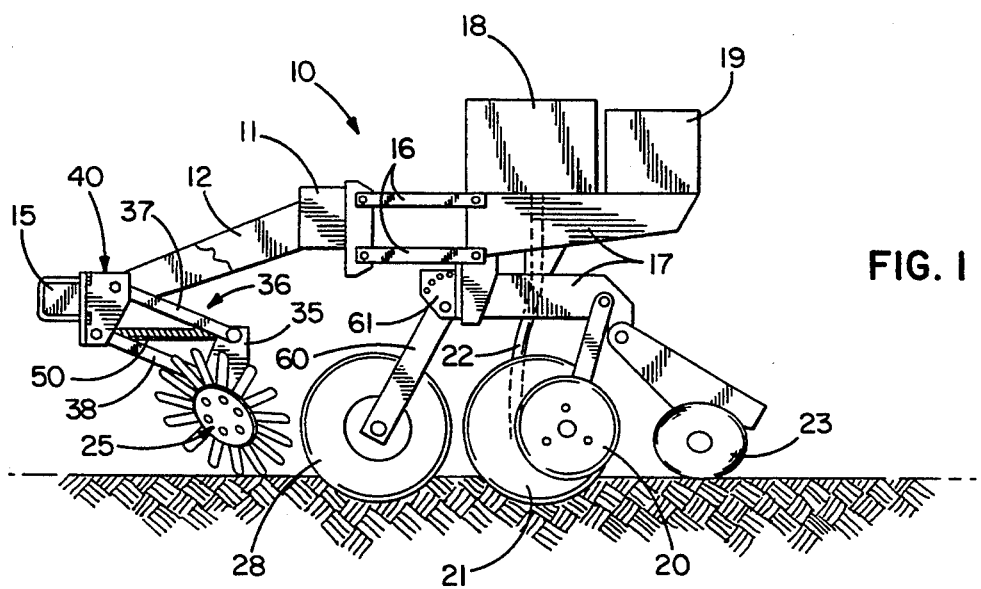
FIG. 1 is a side elevational view showing, in somewhat schematic form, a typical planter unit equipped with a new and improved row cleaner incorporating the unique features of the present invention.

For purposes of illustration, the present invention has been shown in the drawings in conjunction with a row planter unit 10. For the most part, the planter 10 itself is of conventional construction and will be described only briefly.

In general, the planter 10 comprises a main frame member 11 with a forwardly extending component 12 attached to a laterally extending tool bar 15. The latter is adapted to be pulled by a tractor and may support several laterally spaced planters.

Parallel links 16 are pivotally connected between the frame 11 and a rear frame component 17 which supports a seed hopper 18 and preferably a pesticide hopper 19. The frame 17 is supported by a pair of laterally spaced depth gauge wheels 20 located on opposite sides of furrow opening means, the latter herein being formed by two laterally spaced and generally vertical rotatable discs 21 which are inclined so as to converge toward one another upon progressing forwardly. As the planter 10 is pulled forwardly, the discs 21 penetrate the earth to open a narrow furrow whose depth is determined by the setting of the gauge wheels 20. Seeds metered from the hopper 18 are delivered into the open furrow by means of a dispensing tube 22 leading downwardly from the hopper. Thereafter, the furrow is closed by a pair of laterally spaced press wheels 23 which trail the discs 21.

In no-till or low-till farming, the field is not plowed or cultivated to any significant degree between successive crops. The harvesting of row crops from a prior planting leaves behind a residue of live and dead vegetation and plant stubble, the residue sometimes being called residual mulch. For the reasons pointed out in the aforementioned Martin patent, it is desirable to remove the mulch from in front of the furrow opening discs of the advancing planter unit while leaving mulch between adjacent rows and while leaving the soil substantially undisturbed. The apparatus disclosed in the Martin patent purports to achieve this by means of a row cleaner formed by a pair of rotatable sweeper wheels positioned ahead of the furrow opening discs.

The present invention also utilizes a pair of rotatable wheels 25 and 26 to sweep away mulch but, in carrying out the invention, the sweeper wheels are divorced from the frame 17 of the planter unit 10 and are supported to float upwardly and downwardly independently of the gauge wheels 20 and the furrow opening discs 21. In this way, the sweeper wheels may move upwardly and downwardly in accordance with undulations in the soil and may more effectively clear away mulch without significantly cultivating or disturbing the soil. Moreover, the location of the sweeper wheels enables a coulter 28 to be mounted in a conventional location on the planter frame 17, the coulter slicing vertically into the soil ahead of the discs 21 and facilitating opening of the furrow by the discs.

In the present instance, the sweeper wheels 25 and 26 are identical to one another and each comprises a metal hub 30 with a series of angularly spaced and radially extending teeth 31. The ends of the teeth preferably are blunt or rounded rather than being sharp or pointed.

Bearing assemblies 33 rotatably support the wheels 25 and 26 and attach the wheels to the lower end portion of an upright mounting bracket 35. The bearing assemblies extend laterally from opposite sides of the bracket 35 and are located such that the wheel 25 slightly leads the wheel 26. Each bearing assembly is angled downwardly and forwardly so as to locate the centers of the wheels on opposite sides of a vertical plane in the path of travel of the discs 21 at the point of convergence thereof. As the planter 10 is pulled forwardly, the wheels 25 and 26 are rotated by virtue of engaging the ground and act to sweep mulch laterally away from the path of the trailing furrow opening discs 21.

Figure 2:
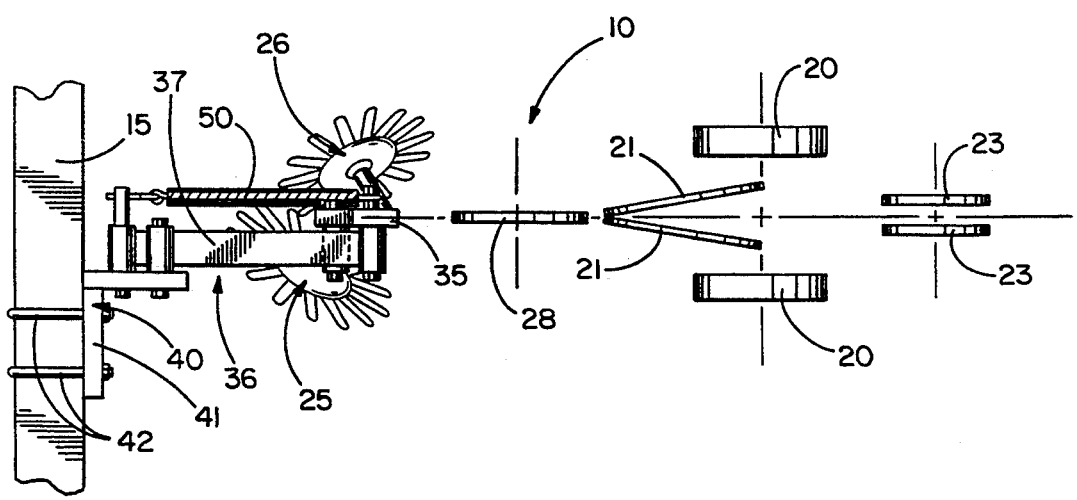
FIG. 2 is an enlarged top plan view showing the row cleaner and schematically showing other components of the planter unit.
Figure 3:
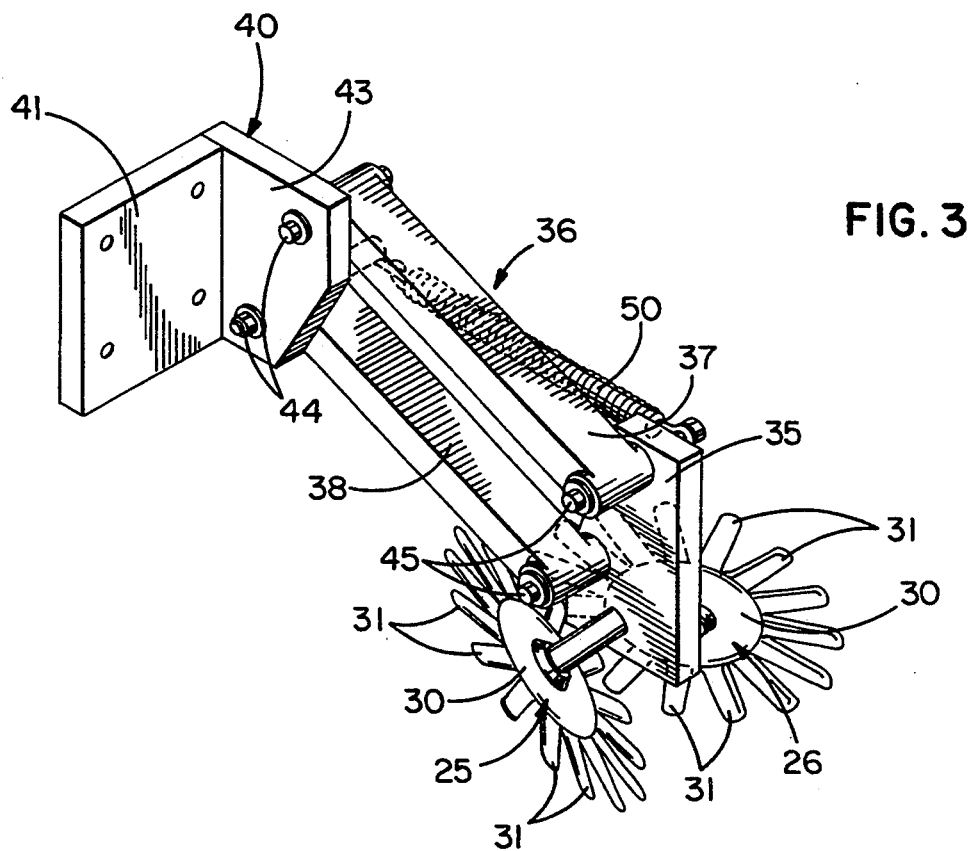
FIG. 3 is an enlarged perspective view of the row cleaner.

Pursuant to the invention, the mounting bracket 35 which supports the wheels 25 and 26 is carried by a parallel linkage 36 which enables limited up and down floating of the wheels so that the vertical position of the wheels may conform to undulations of the ground. Herein, the parallel linkage 36 comprises a pair of upper and lower parallel bars 37 and 38 which extend downwardly and rearwardly from a generally L-shaped mounting bracket 40. The latter includes a first flat plate 41 which is connected rigidly to the tool bar 15 by, for example, a pair of laterally spaced U-bolts 42 (FIG. 2). The bracket 40 also includes a second plate 43 attached to and extending rearwardly from the plate 41. Suitable pivots 44 swingably connect the forward end portions of the bars 37 and 38 to the plate 43. Generally similar pivots 45 swingably connect the rear end portions of the bars to the mounting bracket 35 for the sweeper wheels 25 and 26. As a result of this arrangement, the sweeper wheels 25 and 26 are capable of moving upwardly and downwardly relative to the tool bar 15 but without swinging through any substantial arc during such movement.

Figure 4:
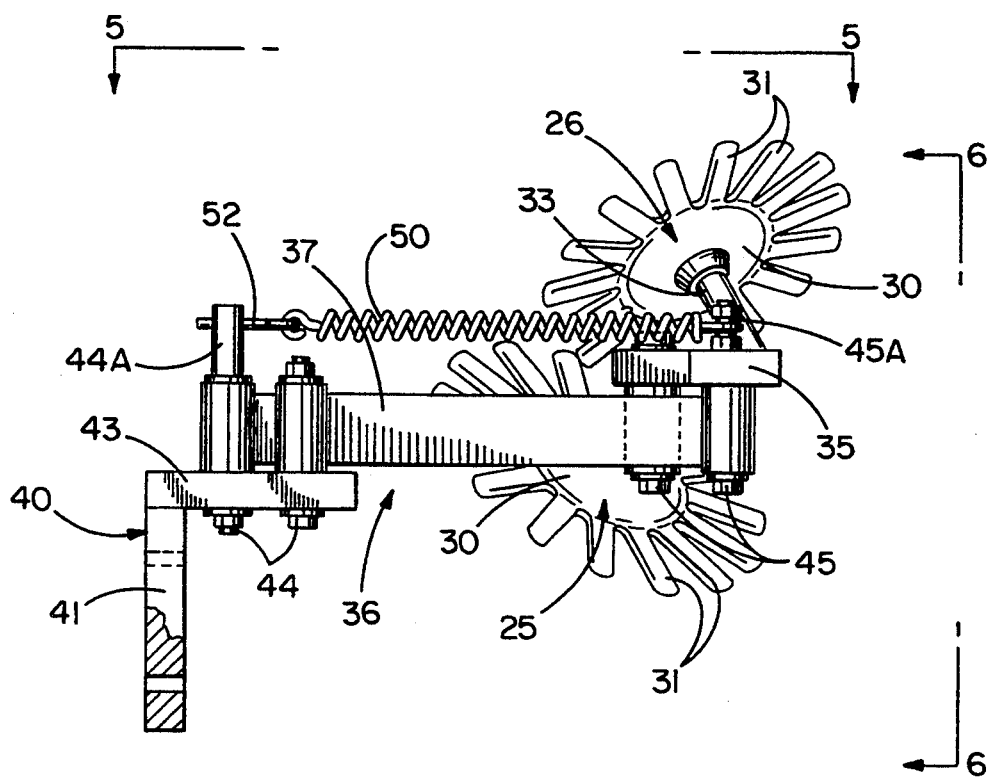
FIG. 4 is a top plan view of the row cleaner shown in FIG. 3.
Figure 5:
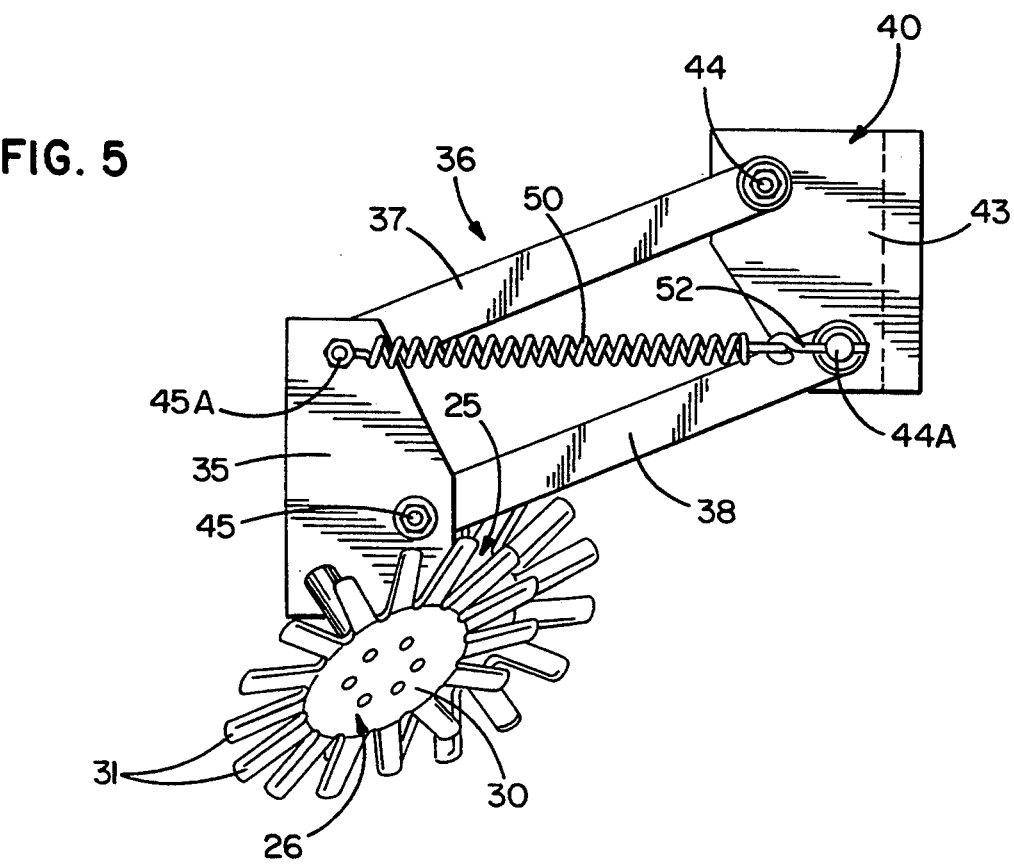
FIG. 5 is a side elevational view as seen along the line 5—5 of FIG. 4.
Figure 6:
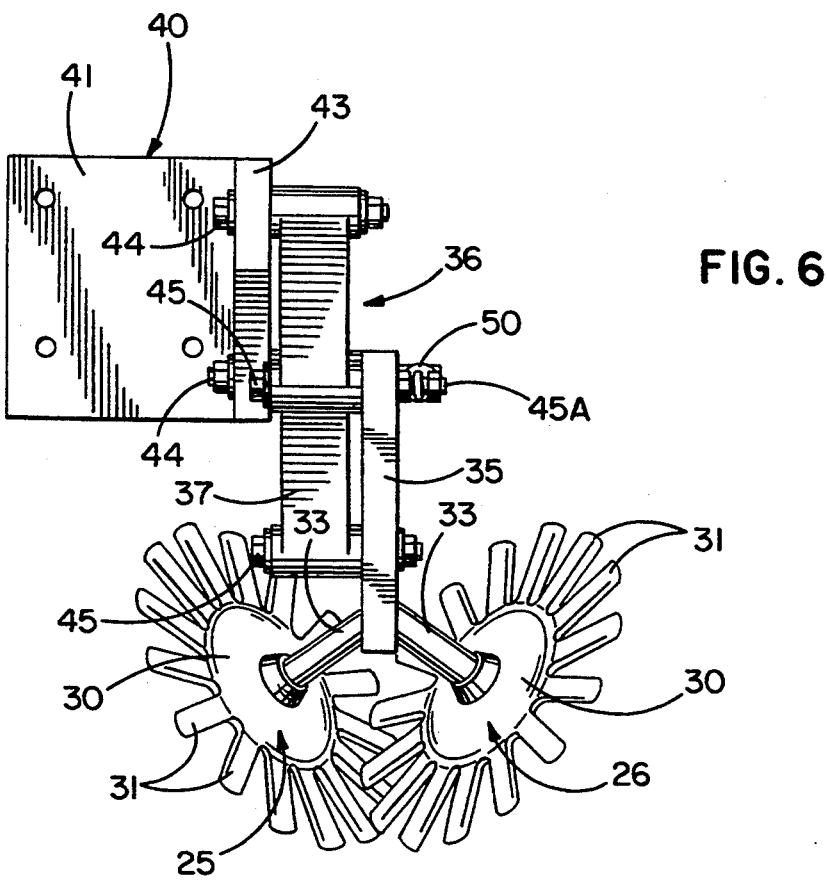
FIG. 6 is a rear elevational view as seen along the line 6—6 of FIG. 4.

The parallel linkage 36 is biased downwardly to press the sweeper wheels 25 and 26 into the soil while allowing the wheels to float upwardly when a rise or obstruction is encountered. For this purpose, an elongated contractile spring 50 (FIG. 4) is connected at its rear end to an extension 45A of the upper rear pivot 45 and is connected at its forward end to an eye-bolt 52, the latter being threaded into an extension 44A of the lower forward pivot 44. By turning the eye-bolt, the tension in the spring may be changed in order to adjust the pressure with which the sweeper wheels engage the soil.

With the sweeper wheels 25 and 26 being suspended independently of the planter frame 17 by the parallel bars 37 and 38, the vertical position of the sweeper wheels is not determined by the setting of the trailing gauge wheels 20. Thus, the sweeper wheels are better able to conform to unevenness in the ground and to effectively remove mulch without significantly disturbing the soil. If the sweeper wheels encounter a valley or dip in the soil, they are capable of swinging downwardly into the dip to sweep away mulch from the surface thereof rather than simply skipping over the dip. On the other hand, if the wheels encounter a ridge or a rise, the wheels float upwardly to sweep away the mulch without gouging into or otherwise significantly disturbing the soil of the rise. Accordingly, substantially bare and untilled soil is left behind the sweeper wheels.

By virtue of the forward location of the sweeper wheels 25 and 26, space is available immediately ahead of the furrow opening discs 21, and such space may be occupied by the coulter 28. Herein, the coulter is journaled on the lower end of an arm 60 (FIG. 1) which is adjustably supported on a mounting bracket 61 conventionally located on the frame 17. The coulter is located in a vertical plane and preferably is of a wavy configuration. The coulter slices vertically into the ground and tills a strip of about 1½" in width immediately ahead of the discs 21 to facilitate opening of the furrow by the discs. Thus, divorcing of the sweeper wheels 25 and 26 from the frame 17 enables the planter 10 to employ the coulter 28 in the normal fashion rather than losing the advantages provided by the coulter.

I claim:

1. Apparatus for use with a planter unit having an elongated and laterally extending bar by which the planter unit is pulled forwardly, the planter unit having means for opening a furrow in minimally tilled or untilled soil, said apparatus comprising a pair of vertically spaced and generally parallel bars having forward ends pivotally connected to said elongated bar to swing upwardly and downwardly independently of said furrow opening means, said parallel bars extending downwardly and rearwardly from said elongated bar, an upright mounting bracket pivotally connected to the rear ends of said parallel bars, a pair of toothed sweeper wheels rotatably supported by said upright mounting bracket and located ahead of said furrow opening means, said wheels being positioned in engagement with the soil and being positioned with their centers on opposite sides of a vertical plane in the path of travel of said furrow opening means whereby forward movement of said planter unit rotatably drives said wheels to cause the wheels to pull residue in laterally opposite directions away from the path of the advancing furrow opening means, and means biasing said parallel bars downwardly to press said wheels into the soil while allowing the wheels to move upwardly and downwardly in uneven soil, said pair of toothed sweeper wheels being the only ground-engaging members carried by said parallel bars.

2. Apparatus as defined in claim 1 in which said planting unit includes a rotatable coulter located ahead of said furrow opening means and adapted to slice vertically into the soil prior to formation of the furrow, said toothed wheels being located ahead of said coulter.

3. A planter unit having an elongated and laterally extending bar by which the planter unit is pulled forwardly, said planter unit having a rotatable coulter movable forwardly along a predetermined path and engageable with minimally tilled or untilled soil to slice generally vertically into the soil, means located behind said coulter for opening a furrow in the soil sliced by the coulter, and means for depositing seed in the furrow, the improvement in said planter unit comprising, a pair of generally parallel bars having forward ends connected to said elongated bar to swing upwardly and downwardly independently of said coulter and said furrow opening means, an upright mounting bracket pivotally connected to the rear ends of said parallel bars, a pair of toothed sweeper wheels rotatably supported by said upright mounting bracket and located ahead of said coulter, said wheels being positioned in engagement with the soil and being positioned with their centers on opposite sides of a vertical plane in the path of travel of said coulter whereby forward motion of said planter unit rotatably drives said wheels to cause the wheels to pull residue in laterally opposite directions away from the path of the advancing coulter, and means biasing said parallel bars downwardly to press said wheels into the soil while allowing the wheels to move upwardly and downwardly in uneven soil, said pair of toothed sweeper wheels being the only ground-engaging members carried by said parallel bars.

* * * * *